United States Patent [19]
Deplante et al.

[11] Patent Number: 5,999,487
[45] Date of Patent: Dec. 7, 1999

[54] SEISMIC REFLECTION DATA ACQUISITION AND PROCESSING METHOD AND DEVICE FOR PROSPECTING IN TECTONICALLY COMPLEX ENVIRONMENTS

[75] Inventors: Christian Deplante, Pau; Eric de Bazelaire, Lescar; Alain Riou, Guilers, all of France

[73] Assignee: Elf Exploration Production, Courbevoie, France

[21] Appl. No.: 09/043,381

[22] PCT Filed: Jul. 11, 1997

[86] PCT No.: PCT/FR97/01280

§ 371 Date: Mar. 18, 1998

§ 102(e) Date: Mar. 18, 1998

[87] PCT Pub. No.: WO98/04933

PCT Pub. Date: Feb. 5, 1998

[30] Foreign Application Priority Data

Jul. 25, 1996 [FR] France .................................. 96 09397

[51] Int. Cl.⁶ ....................................................... G01V 1/36
[52] U.S. Cl. .................................. 367/38; 367/52; 367/50; 367/39; 367/40; 367/74
[58] Field of Search .................................. 367/38, 52, 50, 367/39, 40, 74

[56] References Cited

U.S. PATENT DOCUMENTS

| | | | |
|---|---|---|---|
| 4,611,311 | 9/1986 | Frasier | 367/38 |
| 4,742,497 | 5/1988 | Beasley et al. | 367/52 |

FOREIGN PATENT DOCUMENTS

| | | |
|---|---|---|
| 1 489 908 | 10/1977 | United Kingdom . |
| WO 96/12975 | 5/1996 | WIPO . |

*Primary Examiner*—Christine K. Oda
*Assistant Examiner*—Anthony Jolly
*Attorney, Agent, or Firm*—Evenson, McKeown, Edwards & Lenahan, PLLC

[57] ABSTRACT

A seismic reflection data acquisition and processing method and device for prospecting in tectonically complex environments are disclosed. In particular, the seismic reflection data acquisition and processing method is useful for providing a summation rate tensor field and a 3D image unit, e.g. in 3D earth seismics or complex tectonics.

21 Claims, 8 Drawing Sheets

SEISMIC REFLECTION DATA ACQUISITION AND PROCESSING METHOD AND DEVICE FOR PROSPECTING IN TECTONICALLY COMPLEX ENVIRONMENTS

The present invention concerns a device for and method of acquiring and processing reflection seismic data for exploring a medium with complex tectonics.

In the multiple coverage reflection seismic data acquisition technique emission sources and receivers are disposed on the surface of the medium to be explored. The recordings, in the form of traces, are formed into groups having a same mid point. The series of recordings associated with a same mid point forms what is usually called a common mid point trace gather. To obtain these trace gathers the sources or emitters and the receivers must be distributed over the surface of the medium in accordance with a predetermined geometrical arrangement.

Two categories of devices can be defined: 2D or 3D. In a 2D device the sources and the receivers are theoretically spread out in a line on the surface of the medium, so as to provide a linear distribution of common mid points (CMP), or one that is treated as such, with a single horizontal coordinate for each CMP.

In a 3D device the sources and the receivers are disposed to provide a surface distribution of mid points, or one that is treated as such, with two horizontal coordinates for each CMP.

In FR 2 729 766 of Jan. 23, 1995, hereby incorporated by reference in all aspects concerning the processing of the characteristics or parameters of the medium to be explored, there is described a method of processing seismic data particularly well suited to studying media with complex tectonics and producing parameters characterising at least the stack velocity field associated with reflector components. The method described in FR 2 729 766 proposes, in particular, recording four serial 2D seismic surveys, analogous to conventional marine 3D seismic surveys, and oriented in four directions, any two successive directions being at an angle of substantially 45° to each other. An important advantage of this method is that acquisition can be effected in three dimensions with 2D acquisitions for media that can be explored only in three dimensions.

An object of the present invention is a method of acquiring and processing reflection seismic data producing a tensor stack velocity field and a 3D image block, for example in terrestrial 3D seismic prospecting with complex tectonics.

The method of the invention is of the type using at least one elastic wave source and receivers of waves reflected by at least one reflector of the medium, the reflected wave being recorded in the form of seismic traces, and is characterised in that:

a) a sufficiently large number of seismic traces is generated along a predetermined first direction to obtain in said first direction a first dense distribution of mid points of source-receiver pairs that produced said seismic traces, and for each of the MP distributed along the first direction a CMP trace gather is constituted grouping all the traces produced by the source-receiver pairs that are substantially aligned with the first direction, the mid point of each pair being coincident with the CMP of the trace gather, b) a second dense distribution of MP is generated along a second direction perpendicular to said first direction and a CMP trace gather is constituted for each of the MP distributed along the second direction grouping all the traces produced by the source-receiver pairs that are substantially aligned with the second direction, the mid point of each pair being coincident with the CMP of the trace gather, to obtain series of lines of CMP parallel to the first and second directions which constitute an analysis grid the intersections of which are analysis nodes, the number of seismic traces in each CMP trace gather being sufficient for a curvature analysis of the time distance curves.

In accordance with another feature of the invention, a third dense distribution of MP along a third direction is also generated and for each of the MP distributed along the third direction a CMP trace gather is constituted grouping all the traces produced by the source-receiver pairs that are substantially aligned with the third direction, the mid point of each pair being coincident with the CMP of the trace gather, the number of seismic traces in each CMP trace gather being sufficient for a curvature analysis of the time distance curves.

In accordance with another feature of the invention, a fourth dense distribution of MP is also generated along a fourth direction and for each of the MP distributed along the fourth direction a CMP trace gather is constituted grouping all the traces produced by the source-receiver pairs that are substantially aligned with the fourth direction, the mid point of each pair being coincident with the CMP of the trace gather, the number of seismic traces in each CMP trace gather being sufficient for a curvature analysis of the time distance curves.

In accordance with another feature of the invention, each of the third and fourth directions is at an angle of approximately 45° to each of the first and second directions.

In accordance with another feature of the invention, the analysis grid constitutes a support for a reflection seismic data acquisition device.

In accordance with another feature of the invention, a dense surface distribution 3D coverage is effected simultaneously with the constitution of the analysis grid and in that the MP distributed alone each of said directions are selected from those obtained for the 3D coverage.

In accordance with another feature of the invention, the analysis grid is used with a 3D coverage effected previously.

In accordance with another feature of the invention, for each CMP corresponding to an analysis node a value of the curvature of the time distance curves is determined in each direction, the values obtained in this way being used to determine components of the velocity field at time $t_o$ associated with said CMP and for a given reflector element of the medium, $t_o$ being the vertical travel time with reflection for a zero offset between source and receiver.

In accordance with another feature of the invention, parameters such as: $\theta$, $\tau$, $t_p^{min}$ and $t_p^{max}$ characterising the geometry of a reflector element are determined from the components of the velocity field associated with said reflector element, $\theta$ representing the angle between the first direction and a reference direction, $t_p^{min}$ and $t_p^{max}$ respectively designating the lower and higher values of dip of said reflector element and $\tau$ designating the travel time.

In accordance with another feature of the invention, the meshes of the analysis grid are regular.

In accordance with another feature of the invention, the meshes of the analysis grid are square.

In accordance with another feature of the invention, the analysis meshes are parallelogram shape.

In accordance with another feature of the invention, a device is used which comprises at least two lines of receivers disposed on the analysis grid and at least one source, the receivers being activated according to the type of coverage to be obtained, said source being on or near one of said lines of receivers on each shot.

One advantage of the present invention is that a single seismic data acquisition survey is sufficient to provide velocity data in accordance with a 2×2D, 3×2D or 4×2D analysis grid and simultaneously 3D coverage.

Instead of effecting the 3D coverage simultaneously with the analysis grid, 3D seismic data from a previous acquisition survey for the medium for which the analysis grid is effected can be used.

Other features and advantages will emerge more clearly from a reading of the description of the method of the invention and from the accompanying drawings, in which.

Figure 5:
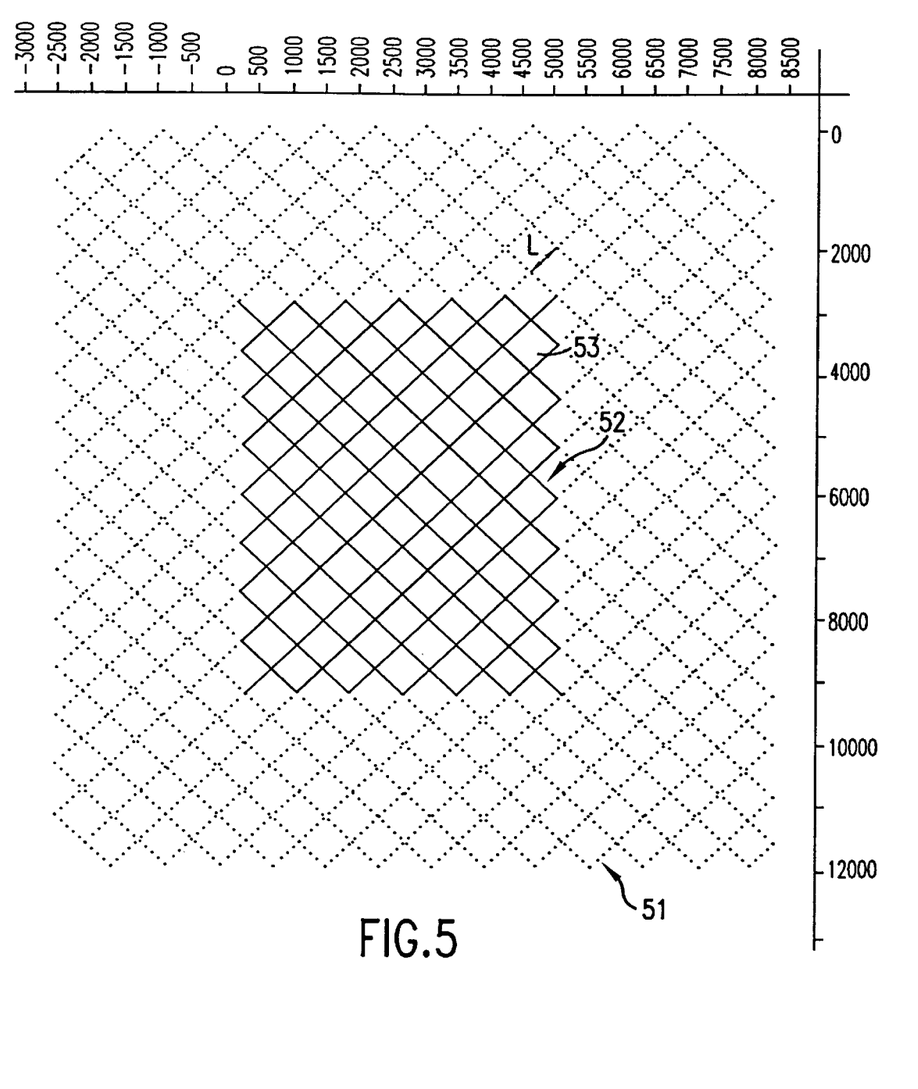
FIG. 5 is a schematic representation of the analysis grid and the source/receiver device of the invention.
Figure 6:
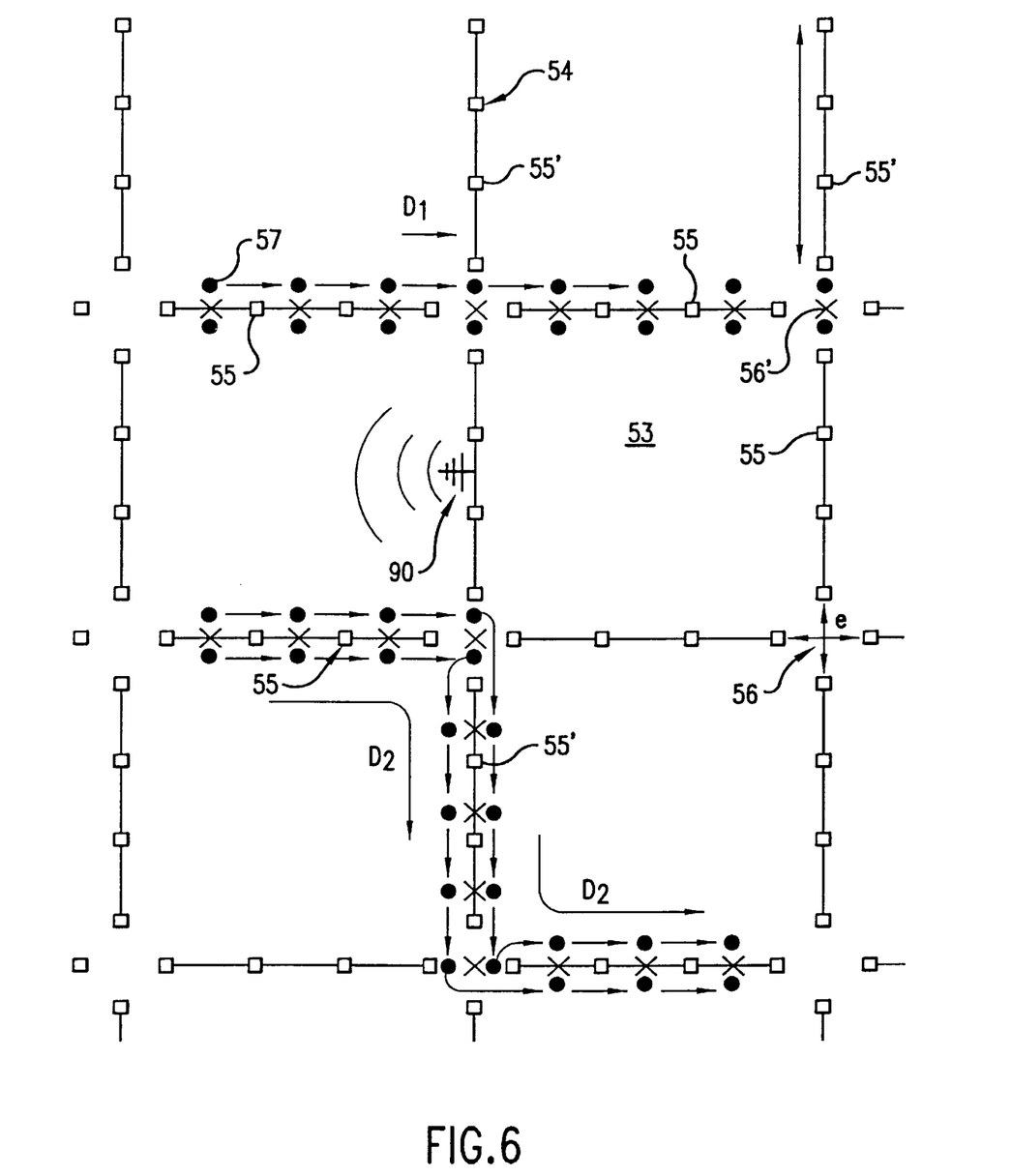
FIG. 6 is a fragmentary schematic representation of the device for a type A coverage.
Figure 7:
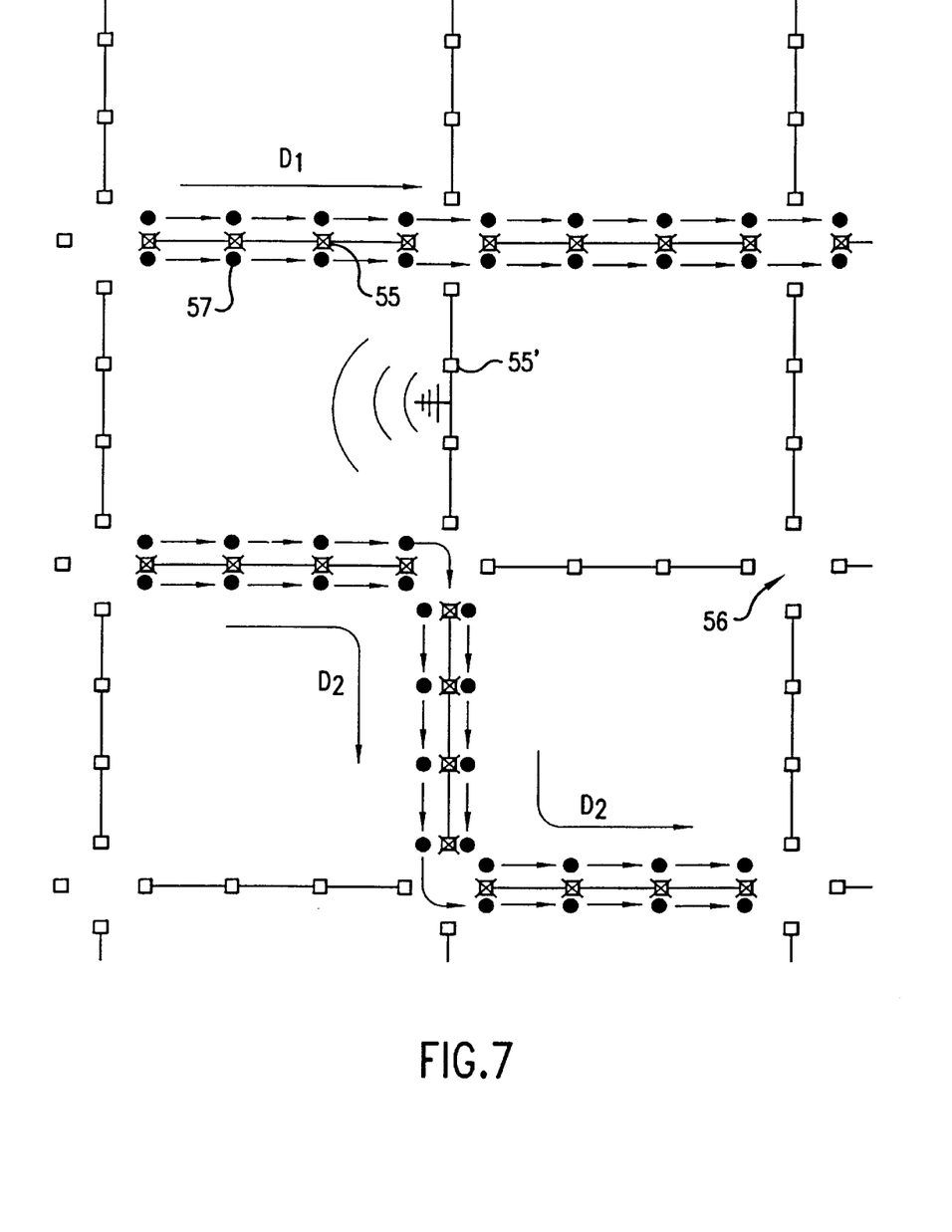
FIG. 7 is a fragmentary schematic representation of the device for a type C coverage.

A seismic data acquisition device is disposed on the surface of the medium to be explored, said surface being the ground or the sea bed, for example (FIGS. 5 through 7).

The acquisition device includes at least one source which emits elastic waves into the medium to be explored and receivers which receive the waves reflected at one or more reflectors. The reflected waves are recorded in the form of seismic traces.

The method of the invention consists in establishing an analysis grid enabling the tensor velocity field in said medium to be determined.

To this end, a sufficiently large number of seismic traces is generated in a first direction 1 with a predetermined azimuth or at an angle $\Phi$ to a reference direction. The number of seismic traces generated in the first direction 1 must be sufficient to obtain a dense distribution of mid points (MP) in said first direction 1. A mid point MP is the point halfway between the source and the receiver of a given source-receiver pair.

In another step a common mid point (CMP) trace gather is constituted for each of the MP distributed over said first direction 1, grouping all the traces produced by the source-receiver pairs that are substantially aligned with the first direction 1 and that are centred on the is CMP, i.e. the mid point (MP) of which is centred on the common mid point (CMP) of the trace gather in question.

In another step, and preferably simultaneously with the foregoing steps, a sufficient number of seismic traces is also generated in the same manner to obtain a dense distribution of MP in a second direction 2 which is perpendicular to the first direction 1. A CMP trace gather is also constituted for each of the MP distributed along the second direction 2, grouping together all the traces produced by the source-receiver pairs that are substantially aligned with the second direction $D_2$ and centred on the CMP of the trace gather in question.

Series of lines 11 of MP parallel to the direction 1 and series of lines 21 of MP parallel to the direction 2 are obtained.

Figure 1:
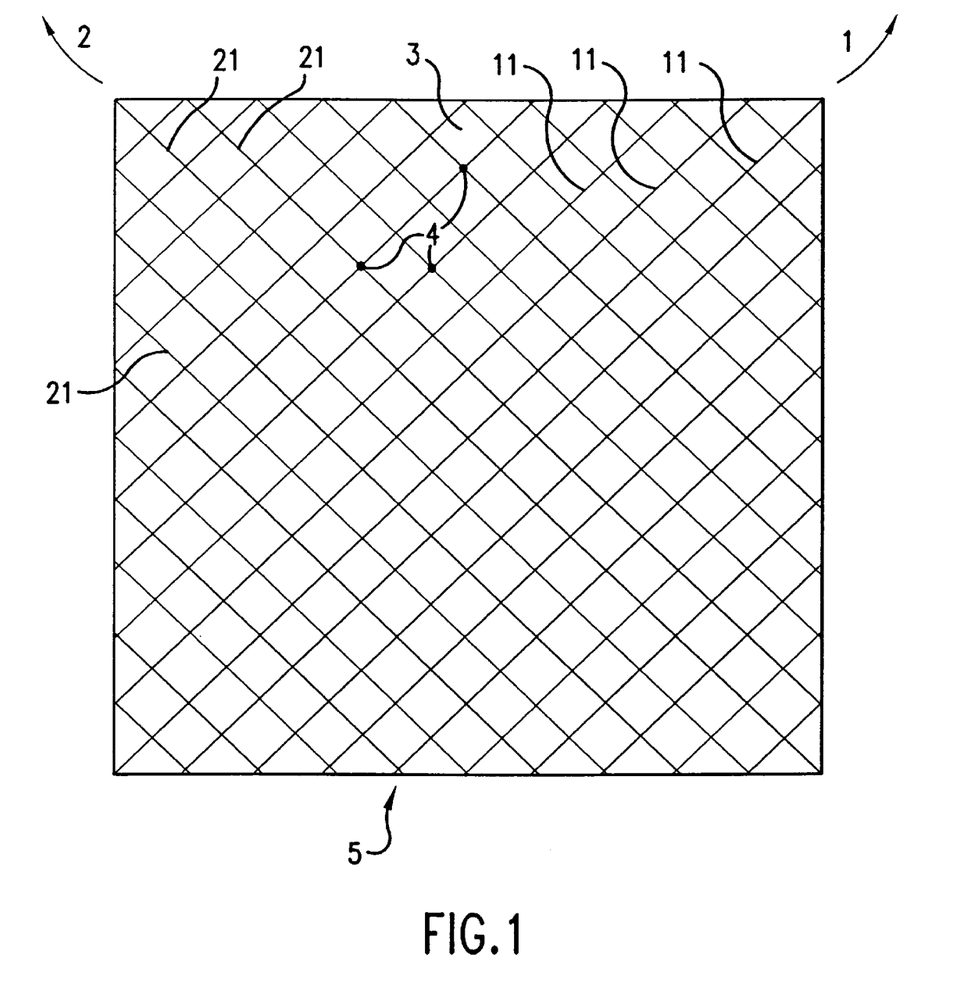
FIG. 1 is a schematic representation of a 2×2D analysis grid.

The two series of lines 11 and 21, known as analysis lines, constitute an analysis grid 5 the meshes 3 of which are of regular shape, for example diamond shape, as shown in FIG. 1. The nodes 4 of the meshes constitutes analysis nodes for the velocity field. The analysis grid 5 is known as a 2×2D analysis grid.

Figure 2:
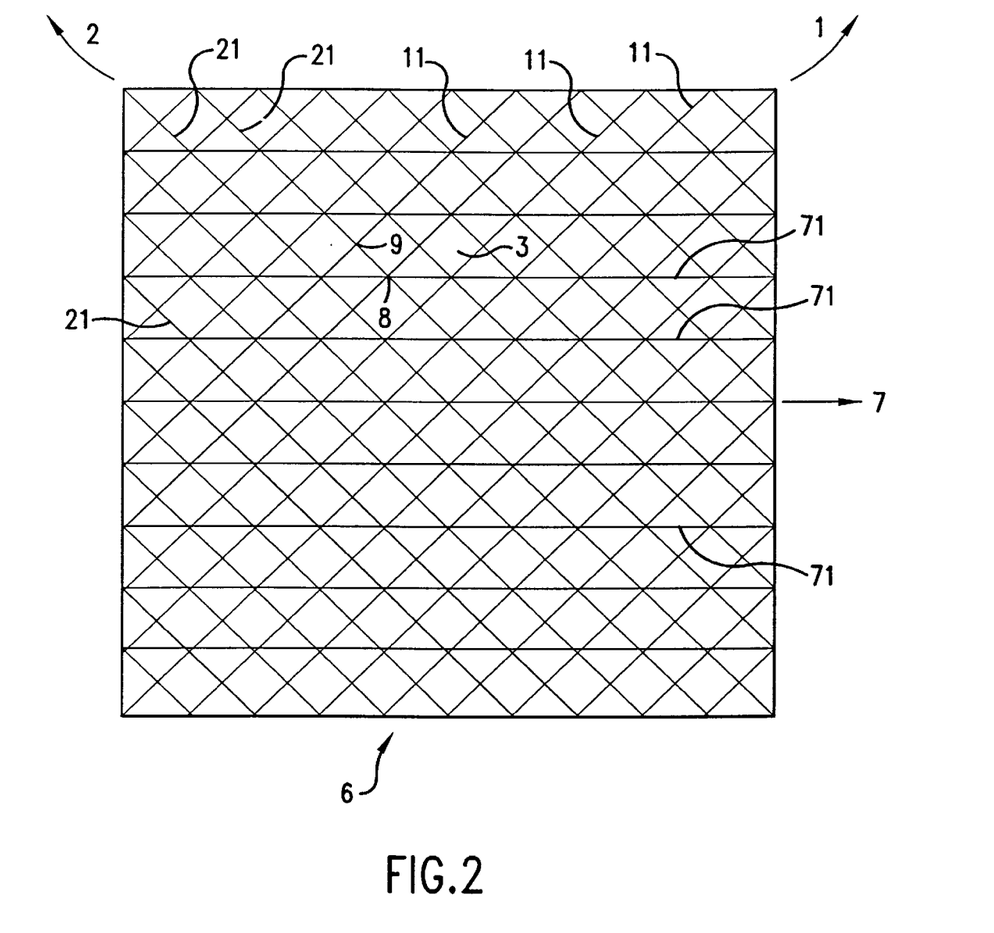
FIG. 2 is a schematic representation of a 3×2D analysis grid.

In one variant of the method, as shown in FIG. 2, a 3×2D analysis grid 6 is derived from the analysis grid 5 by adding a third direction 7 which is preferably at an angle of about 45° to each of the directions 1 and 2. Lines 71 of MP parallel to the third direction 7 are obtained in the same way.

The lines 71 intersect the lines 11 and 21 at points which are already points of intersection of said lines 11 and 21. These triple intersection points 8 are analysis and stacking nodes for the grid 6 whereas the double intersection points 9 (between a line 11 and a line 21 only) are stacking nodes only.

A number of traces sufficient to obtain a dense distribution of MP along the lines 71 is also generated for each of the lines 71, in the same manner as for the lines 11 and 21, and a CMP trace gather is also constituted for each of the MP distributed along said lines 71 and groups all the traces produced by the source-receiver pairs that are substantially aligned with the third direction 7 and centred on the CMP of the trace gather in question.

Figure 3:
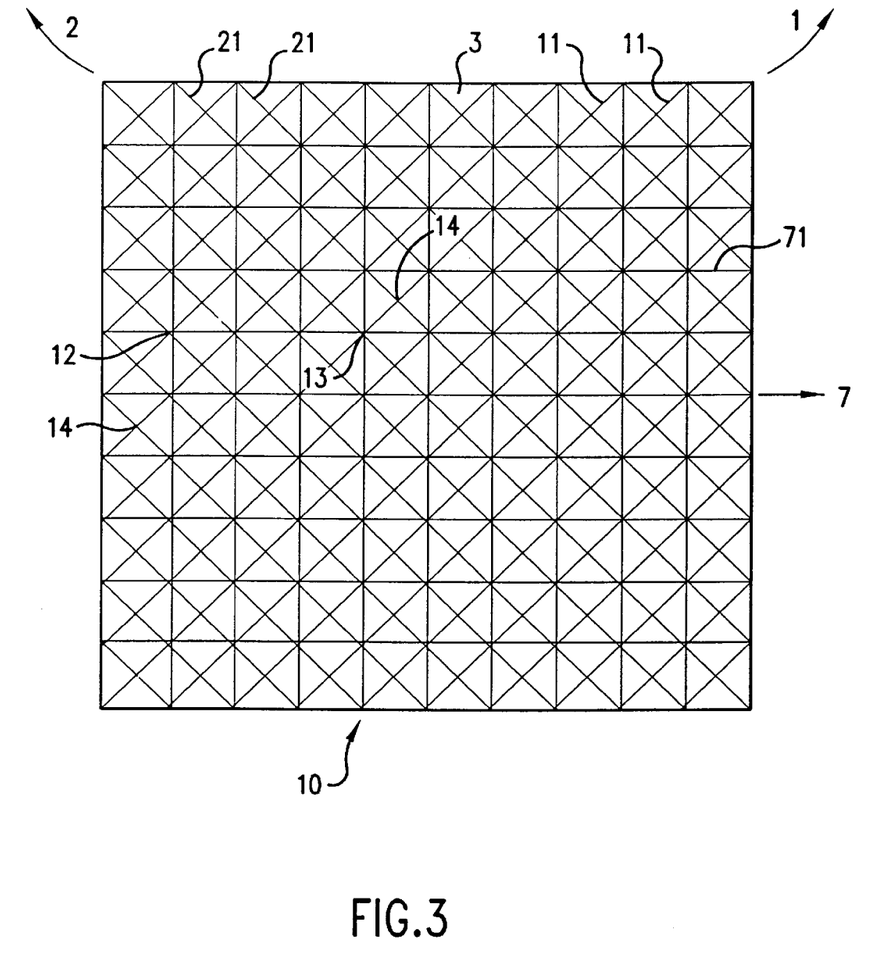
FIG. 3 is a schematic representation of a 4×2D analysis grid.

In another variant shown in FIG. 3, a 4×2D analysis grid 10 is derived from the grid 6 by adding a fourth direction 12 which is preferably at an angle of about 45° to each of the directions 1, 2 and 7. Lines 121 of MP that are parallel to the fourth direction 12 are obtained in the same manner. The lines 121 are substantially perpendicular to the lines 71 and pass through the points of triple intersection of the lines 11, 21 and 71, which thus become points of quadruple intersection 13. The intersection points 13 are analysis and stacking nodes for the grid 10, the other, non-quadruple intersection points 14 being stacking nodes.

The density of the analysis nodes for each of the grids 5, 6 and 10 is chosen to obtain regular surface spatial sampling for the acquisition device used and suited to the analysis grid supporting it. The regular spatial sampling of the surface is adapted to suit the spatial fluctuations of the velocity field near that surface.

The density of the CMP alone the analysis lines is chosen to sample correctly the reflectors of the medium with the greatest dip or the diffractions present in the medium, for the purposes of curvature analysis.

Each analysis line CMP groups a sufficient number of traces the azimuth of which, i.e. that of the associated source-receiver pair, is close to that of the direction in question, to effect a curvature analysis of the time distance curves for that azimuth.

The expression "substantially aligned" used hereinabove means corresponding to the angular tolerance of the analysis for which an error of approximately 15° relative to the colinearity of source-receiver pairs and analysis lines can be used.

In the method of the invention the 2×2D, 3×2D or 4×2D coverage is associated with a 3D coverage for the medium concerned.

The 3D coverage can be effected simultaneously with constituting one of the analysis grids and has a dense surface distribution. The MP distributed in the directions of the grid used are selected from those obtained for the 3D coverage.

It is also possible to associate the 2×2D, 3×2D or 4×2D coverage with a 3D seismic coverage previously done for the medium in question.

Figure 4:
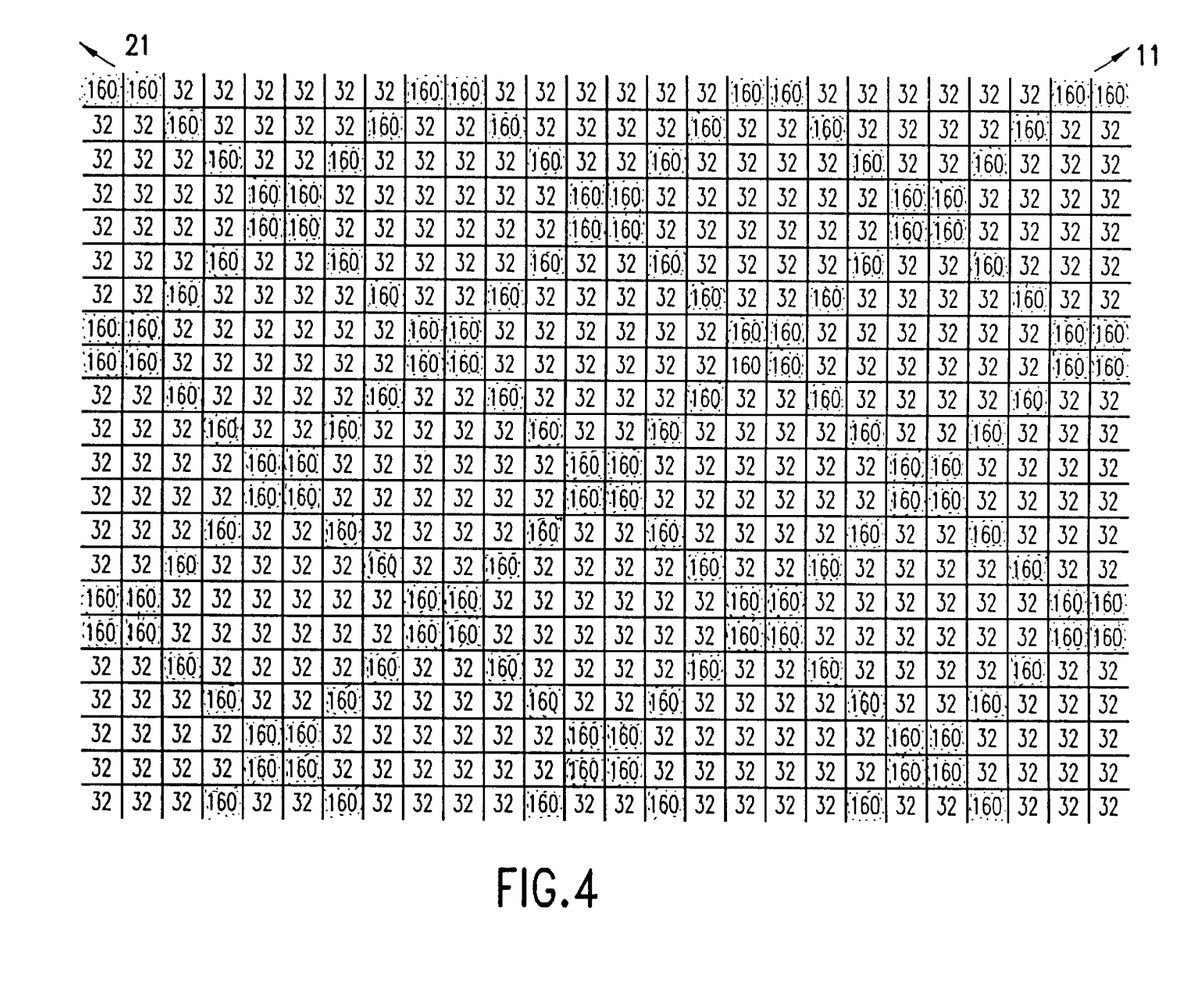
FIG. 4 is one example of a 2×2D and 1×3D coverage map.

FIG. 4 shows one example of a coverage map for the analysis grid 5 shown in FIG. 1. Along the analysis lines 11 and 21 there are a large number of MP (around 160), compared to the number of MP along lines that are not analysis lines (32).

The data is in two separate parts:
 a) data recorded with common mid points along analysis lines; and
 b) data recorded with common mid points off these analysis lines.

Initially, the traces with common mid points on the analysis lines are extracted. They are common mid point sorted as if these traces were 2D traces. The CMP are extracted from the traces, each being a double, triple or quadruple analysis node according to whether the information was recorded in the particular azimuth direction and in the orthogonal 2×2D direction or in three directions (3×2D) or four directions at 45°.

At each analysis node, and for each direction, there is obtained a measurement of the parameters $t_o$ and $t_p$ for each integer of the curvature analysis, as explained in FR 2 729 766.

In the case of two directions, it is assumed that there is an exact DIP and STRIKE orientation. In this case, the two measured values of $t_p$ for the same $t_o$ are the two extreme values $t_p^{min}$ and $t_p^{max}$.

In the case of four directions, the parameters $\alpha$, $\tau$, $t_p^{min}$ and $t_p^{max}$ describing the shape of the local summation (stack) umbrella are deduced from the four measured values of $t_p$ for the same $t_o$ in each direction and by tensor inversion.

The angle $\alpha$ represents the orientation of the major axis of the stack umbrella relative to a reference axis. If an angle $\Theta$ relative to the major axis of the stack umbrella is defined, the value of $t_p(\Theta)$ is given by the formula:

$$t_p(\Theta) = \frac{t_p^{min} t_p^{max} - \tau[t_p^{min}\cos^2\Theta + t_p^{max}\sin^2\Theta]}{t_p^{min}\sin^2\Theta + t_p^{max}\cos^2\Theta - \tau} \quad (1)$$

The azimuth $\Phi$ of the trace relative to the reference axis is given by the formula:

$$\phi = \alpha - \Theta \quad (2)$$

The parameter $t_p(\Theta)$ is associated with each trace recorded in the field, defined by its azimuth $\Phi$ and its offset $\xi$ using equations (1) and (2).

The obliquity correction $\Delta t$ to be applied to this trace for subsequent in-phase stacking of the various traces of a bin having different azimuths and offsets is given by the following formula:

$$\Delta t = -t_p(\Theta) + \sqrt{t_p(\Theta)^2 + \xi^2 V_o^2} \quad (3)$$

Accordingly, by means of the 4×2D coverage associated with a 3D coverage, powerful stacking can be effected on all the bins, while the stacking parameters depend on the azimuth, which is the case with complex tectonics.

Between two diagonally opposed and consecutive analysis nodes, the measured values of $t_p$ are interpolated linearly and perpendicularly to the direction of the recording lines. Four interpolations are required to grid the terrain. Any mid point off the diagonal lines will be provided with four values of $t_p$ interpolated bi-linearly from interpolated values along the diagonals of each respective square. The parameters $\alpha$, $\tau$, $t_p^{min}$ and $t_p^{max}$ defining the shape of the local stack umbrella are then calculated.

In the 2×2D case, the parameter $\tau$ cannot be estimated directly. There are two solutions to this problem: the first is to use an oblique third acquisition direction, at about 45° to one of the previous two (change to 3×2D), in order to obtain an independent measurement and to estimate the parameter $\tau$. The second solution is, if the medium is not too complex, either to make an approximation, for example $\tau=0$, or to look for the optimal value of this parameter for stacking, for example by scanning values of $\tau$ in each bin 3D or group of 3D bins.

In the case of a single structural axis satisfying the 3×2D hypotheses, the orientation of the two perpendicular directions of the analysis grid with the DIP and STRIKE axes is desirable because the tensor equations to be solved are then simplified, but not necessary in that, for each 3×2D analysis node, there are three independent measurements of curvature $t_{p1}$, $t_{p2}$, and $t_{p3}$, for solving the three unknown parameters ($t_p^{min}$, $t_p^{max}$ and $\tau$).

To obtain the 4×2D+3D surface spatial sampling suitable for the processing as described hereinabove, it is possible to use any devices provided that 2D and 3D coverages are obtained, in such manner as to effect the coverage required for the processing. A 2×2D+1×3D basic device is advantageously used to acquire the data and, combined with other acquisition devices, yields complete 1×3D+4×2D and 2×3D+4×2D coverages together with sub-coverages of type 2×3D+2×2D; 2×3D+3×2D; 1×3D+2×2D; 1×3D+3×2D.

For example, the 1×3D+4×2D coverage can be obtained by combining the 1×3D+2×2D coverage with the 2×2D coverage or the 1×3D+1×2D coverage with the 3×2D coverage or the 1×3D coverage with the 4×2D coverage.

The two variants of the device shown in FIGS. 6 and 7 can be used to obtain these coverages.

A particularly beneficial device for implementing the method of the invention is of the type described hereinafter.

A source system and a receiver system that constitute the device proper are laid out on the surface to be covered (FIG. 5), to be more precise the surface for which the above coverages are to be obtained, and which is represented by an analysis grid 51 like that of FIG. 1.

The receiver system comprises a group of lines 52 which comprises a number of regular square or lozenge-shape meshes 53 with receivers situated along the lines of the analysis grid. The group 52 is moved after each emission or series of emissions, as explained below, to cover said analysis grid 51.

On each side of a mesh 53 of the group 52 there is an elementary strand 54 which is in fact a string of receivers 55, for example four receivers, evenly spaced by a distance e known as the intertrace distance.

The length l of each strand is less than the side length L of the mesh of the analysis grid 51 and is equal to L-e, with e/2 at each end, so that four consecutive strands in a cruciform disposition and belonging to four adjacent meshes of the group are a distance equal to e apart in the two perpendicular directions. In other words, the strands are disposed in the perpendicular directions so that a square gap 56 with a side length $e\sqrt{2}/2$ is created at the crossover of said directions and no receiver is at the vertices of the meshes of the analysis grid 51. Accordingly, the ends of each elementary strand 54 are spaced from the ends of the side of the mesh of the analysis grid on which it is disposed.

The number of strands or the succession of strands of each receiver line depends essentially on the size of the group to be moved over the analysis grid.

The source system may be of various forms according to the nature of the source and the number of sources used for each shot.

When the source is a single vibrator, it is necessary to move it from one point to another for each shot; however, it is possible to use a plurality of vibrators that can be actuated simultaneously or sequentially one after the other. If explosives are used as the source, they are disposed on the group in accordance with the type of coverage to be obtained.

To obtain a simple 2D coverage, it is necessary to emit and to receive in the same displacement direction $D_1$, i.e. the source(s) 57 are "colinear" with the receivers 55. Colinearity is obtained if the source(s) 57 are on or near the string of receivers 55 without being on the same line. The simple 3D coverage is obtained with receivers 55' which are disposed in two directions at an angle to each other which is a multiple of 45° in the chosen example.

In the embodiment shown in FIG. 6 the shot is effected between two receivers 55 and substantially half-way between two consecutive receivers 55. In this case there is a source at the centre 56' of the gap 56 created between the strands. If the receivers 55 are only activated, a simple 2D coverage is obtained. If the receivers 55 and 55' of two perpendicular strands are activated, a 3D coverage and a 2×2D coverage are obtained. If the receivers 55 and 55' of three zig-zag strands are activated (arrows $D_2$) a 1×3D+3× 2D coverage is obtained. If the source is at the centre 56' of the gaps 56, there is obtained what is referred to herein as a type A coverage.

If the source is very close or over the receivers 55 and 55' (FIG. 7), i.e. when there is no source at the centre 56' of the gaps 56, 2D (colinear sources and receivers), 1×3D+2×2D (sources and receivers in perpendicular directions) and 1×3D+3×2D (zig-zag sources and receivers) coverages are obtained in the same manner as previously. However, this type with no source at the centre 56' of the gaps 56 is referred to herein as a C coverage.

Figure 8:
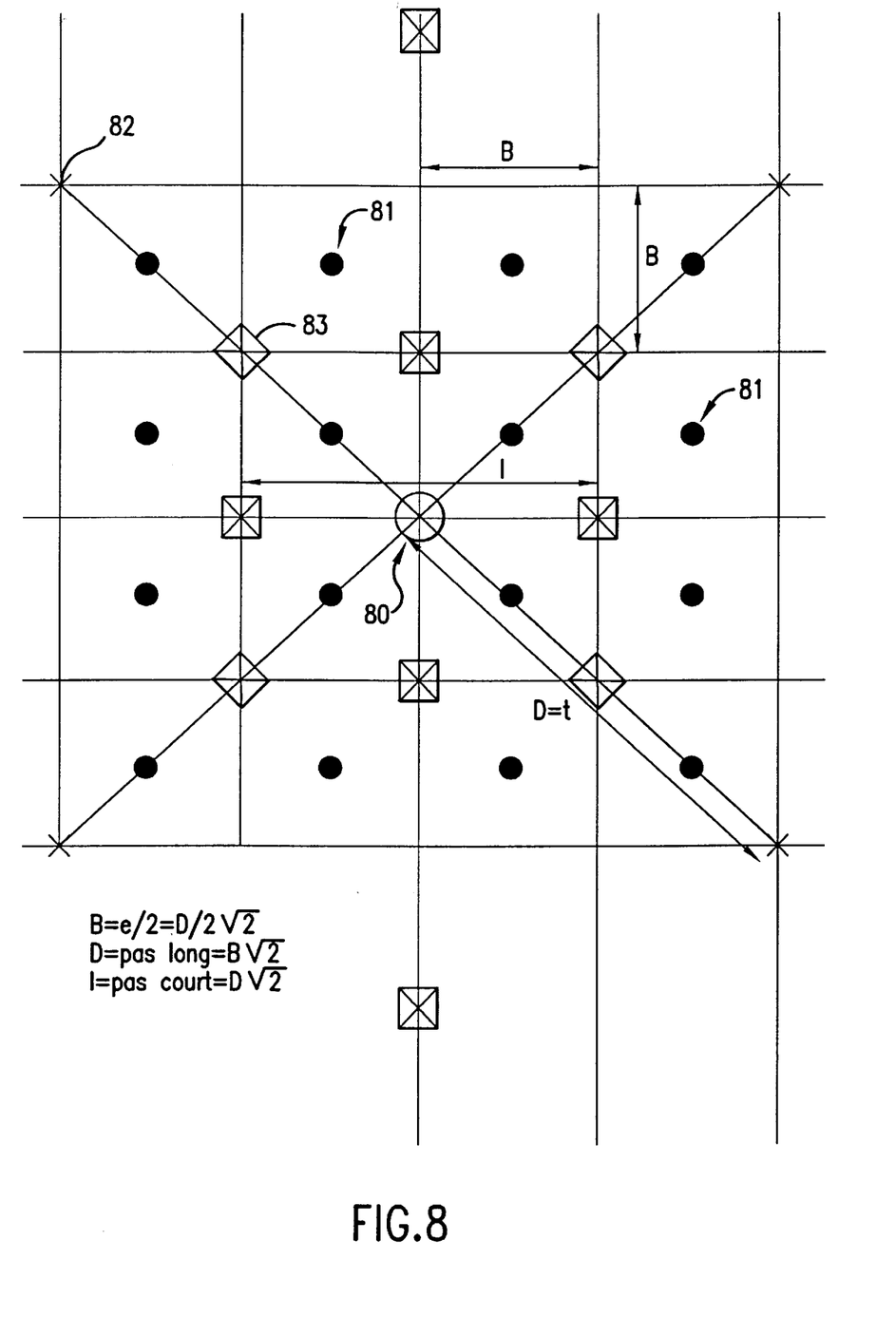
FIG. 8 is a fragmentary schematic representation of the device for a combination of type A and C coverages.

The two coverage types A and C can obviously be combined by effecting shots successively at the locations of the receivers of each elementary strand 54 and halfway between two consecutive receivers 55 or 55' of each elementary strand and at the crossovers 56' of the directions of said elementary strands. An analysis node 80 of this combination is shown in FIG. 8, in which the black dots 81 represent the mid points, the crosses 82 represent the sources and the squares 83 represent the receivers, the node 80 corresponds to the quadruple node from FIG. 3. The combination can be effected in compliance with the geometrical conditions indicated in FIG. 8.

For example, it is possible to bin a type A device, of 3D coverage equal to 8, with another of type C, with the same coverage expanded by a factor of √2 and rotated 45° relative to the type A device, so as to obtain in each bin, under these conditions, an average of 16 mid points the azimuth and offsets of which cover a range between less than an intertrace distance and the half-diagonal of the largest size of the group.

Note that the advantage of the method is that it allows the processing to be carried out to correct the curvature of the time distance curve (known from a study of the 4×2D velocity field in the general case) enabling the in-phase addition of all the azimuth and of all the offsets, for example, even when this correction varies as a function of azimuth. In this case, even with complex tectonics, full benefit is obtained from the redundancy of the reflected signals, whereas the average values of incoherent signals and noise from recordings for which the sources and the receivers are spread over the surface and statistically far apart from each other are strongly attenuated after addition.

As shown diagrammatically in FIGS. 6 and 7, each strand is provided with a transmitter 90 which is connected by a wireless, for example radio, link to the recording laboratory which receives the data from a certain number of strands for each shot, organises it into the form of groups and records it on a magnetic storage medium, for example, for processing by the method of the invention.

To avoid problems of crossing over of the receiving strands and when vibrators are used, as shown in FIGS. 6 and 7, it is preferable to lay out two parallel source lines on respective opposite sides of the strand along which the two source lines are moved, the distance between each source line and the strand being equal to e/4, for example.

The acquisition can be effected in the following manner, for example:

the source and receiving points of the analysis grid 51 are defined by means of a topographic survey, a group 52 is laid out over a sufficient area of the analysis grid to effect all of the required reception, sources are actuated along strands either in a straight line or in a zig-zag covering all of the area of the group, only data from receivers of strands beneficial to obtaining the 3D and/or 2D coverage being recorded at each source point, for a type A coverage, each shot point is longitudinal located at apposition centred between two successive receivers and at the centre of the gaps between the strands (FIG. 6), for a type C coverage, each shot point is at a longitudinal position located on each receiver or on respective opposite sides of each receiver (FIG. 7), if the receive system includes more than one active strand, other sources (in a zig-zag or in straight line) can be used to complete the coverage over the group (FIG. 5), when adequate 2D and 3D coverages have been obtained for a group, said group is moved to an adjacent part of the analysis grid so that continuity and homogeneity of 3D coverage are assured by further shots.

The device described hereinabove can also be used in the OBS (ocean bottom survey) technique. In this application, geophone type receivers with one or three components and/or hydrophones are laid out on the sea bed, for example by spreading heavy seismic cables from cable-laying ships. These receivers are linked to a recording laboratory. The shot is effected from the surface, for example by a source boat equipped with air guns.

To obtain type A or C 2×2D+1×3D records, the procedure is as follows:

initially a sufficient number of cables and recording laboratories are provided to cover a 1×3D+2×2D group (complete 3D coverage obtained by translation of this group), a first array of cables is spread in one direction, for example North, to define the first direction of the mesh on the group, the same array or another array of cables is then spread over the group in the perpendicular direction, for example West, to obtain intersections between the directions and at the mid point of two consecutive receivers; this yields a receiving geometry that suits a type A or C device, shots can then be effected, for example, firstly along a series of lines sailed in vertical alignment with each of the North lines, followed by another series of shots in vertical alignment with the West lines, in either direction along the lines, fixing the shot points between two receiving points (type A) or in coincidence with these points (type C), the data from each of the receivers of the group for each shot can be recorded, for example, and then the records sorted again to reconstitute the required homogeneous 2D and 3D coverages of the group.

It is then sufficient to move the group an appropriate distance, for example first towards the North and then towards the West, to gradually cover all of the required surface both in 2×2D and in 3D and in a homogeneous manner, with a view to assembling the data, for example with the complementary 2×2D+1×3D survey, and processing it conjointly.

We claim:

1. Method of processing reflection seismic data for exploring a medium with complex tectonics, wherein at least one source of elastic waves and receivers of waves reflected by at least one reflector of the medium are used, the reflected waves being recorded in the form of seismic traces, said method comprising the acts of:
   a) generating a sufficiently large number of seismic traces along a predetermined first direction for obtaining in said first direction a first dense distribution of mid points (MP) of source-receiver pairs that produced said seismic traces, and constituting for each of the MP distributed along the first direction a CMP trace gather grouping all the traces produced by the source-receiver pairs that are substantially aligned with the first direction, the mid point of each pair being coincident with the CMP of the trace gather;
   b) generating a second dense distribution of MP perpendicular to said first direction, and constituting for each of the MP distributed along the second direction a CMP trace gather grouping all the traces produced by the source-receiver pairs that are substantially aligned with the second direction, the mid point of each pair being coincident with the CMP of the trace gather, said acts being carried out for obtaining series of lines of CMP parallel to the first and second directions which constitute an analysis grid having regular meshes of which intersections are analysis nodes, the number of seismic traces in each CMP trace gather being sufficient for a curvature analysis of the time distance curves.

2. Method according to claim 1 wherein a third dense distribution of MP along a third direction is also generated and for each of the MP distributed along the third direction a CMP trace gather is constituted grouping all the traces produced by the source-receiver pairs that are substantially aligned with the third direction, the mid point of each pair being coincident with the CMP of the trace gather, the number of seismic traces in each CMP trace gather being sufficient for a curvature analysis of the time distance curves.

3. Method according to claim 1 wherein a fourth dense distribution of MP is also generated along a fourth direction and for each of the MP distributed along the fourth direction a CMP trace gather is constituted grouping all the traces produced by the source-receiver pairs that are substantially aligned with the fourth direction, the mid point of each pair being coincident with the CMP of the trace gather, the number of seismic traces in each CMP trace gather being sufficient for a curvature analysis of the time distance curves.

4. Method according to claim 2 wherein each of the third and fourth directions is at an angle of approximately 45° to each of the first and second directions.

5. Method according to claim 1 wherein the analysis grid constitutes a support for a reflection seismic data acquisition device.

6. Method according to claim 1 wherein a dense surface distribution 3D coverage is effected simultaneously with the constitution of the analysis grid and in that the MP distributed along each of said directions are selected from those obtained for the 3D coverage.

7. Method according to claim 1 wherein the analysis grid is used with a 3D coverage effected previously.

8. Method according to claim 1 wherein for each CMP corresponding to an analysis node a value of the curvature of the time distance curves is determined in each direction, the obtained values being used to determine the components of the velocity field at time to associated with said CMP and for a given reflector element of the medium, to being the vertical travel time with reflection for a zero offset between source and receiver.

9. Method according to claim 8 wherein parameters such as $\theta$, $\tau$, $t_p$min and $t_p$max characterising the geometry of a reflector element are determined from the components of the velocity field associated with said reflector element, $\theta$ representing the angle between the first direction and a reference direction, $t_p$min and $t_p$max respectively designating the lower and higher values of dip of said reflector element and $\tau$ designating the travel time.

10. Method according to claim 1 wherein meshes of the analysis grid are square.

11. Method according to claim 1 wherein the analysis meshes are parallelogram shape.

12. Device for implementing the method according to claim 1 and comprising at least two lines of receivers disposed on the analysis grid and at least one emission source, the receivers being activated according to the type of coverage to be obtained, said source being on or near one of said lines of receivers on each shot.

13. Device according to claim 12 wherein the source is very close or over a receiver on each shot.

14. Device according to claim 12 wherein the source is at the mid point between two consecutive receivers on each shot.

15. Device according to claim 12 wherein the two lines of receivers are perpendicular.

16. Device according to claim 12 wherein each line of receivers comprises a succession of elementary strands, each elementary strand being disposed on one side of a mesh of the analysis grid and comprising a given number of receivers, the length (l) of each elementary strand being less than the side length (L) of said mesh.

17. Device according to claim 16 wherein the ends of each elementary strand are spaced from the ends of the side of the mesh on which it is disposed.

18. Device according to claim 14 wherein shots are effected between the consecutive receivers of the strands and at the crossovers of the directions of the elementary strands.

19. Device according to claim 13 wherein shots are effected at the location of the receiver positions of each of the strands.

20. Device according to claim 18 wherein the shots are effected successively at the location of the receiver positions of each elementary strand, at the mid point between two consecutive receivers of each elementary strand and at the crossovers of the directions of the elementary strands.

21. Device according to claim 12 wherein a set of elementary strands constitutes a group of lines that is moved over the analysis grid.

* * * * *